United States Patent
Smith

(10) Patent No.: US 7,866,733 B2
(45) Date of Patent: Jan. 11, 2011

(54) VEHICLE CARGO BED TENT CAMPER SECOND TIER FLOOR

(76) Inventor: Edward J. Smith, 111 W. Brentridge Dr., Brandon, FL (US) 33511

( * ) Notice: Subject to any disclaimer, the term of this patent is extended or adjusted under 35 U.S.C. 154(b) by 89 days.

(21) Appl. No.: 12/228,121

(22) Filed: Aug. 8, 2008

(65) Prior Publication Data

US 2009/0008960 A1      Jan. 8, 2009

Related U.S. Application Data

(63) Continuation-in-part of application No. 12/011,432, filed on Jan. 25, 2008, now abandoned, which is a continuation-in-part of application No. 11/101,322, filed on Apr. 7, 2005, now Pat. No. 7,322,637.

(51) Int. Cl.
*B60P 3/345* (2006.01)

(52) U.S. Cl. ..................... 296/164; 296/165

(58) Field of Classification Search .............. 296/164, 296/39.2, 37.6, 156, 26.01, 26.12, 26.15, 296/159, 165; 224/404; 135/88.13
See application file for complete search history.

(56) References Cited

U.S. PATENT DOCUMENTS

| | | | | |
|---|---|---|---|---|
| 3,680,908 | A * | 8/1972 | Bowen | 296/170 |
| 3,737,190 | A * | 6/1973 | Smith et al. | 296/159 |
| 4,005,898 | A * | 2/1977 | Way | 296/174 |
| 4,294,484 | A * | 10/1981 | Robertson | 296/164 |
| 4,573,731 | A | 3/1986 | Knaack et al. | |
| 4,592,583 | A | 6/1986 | Dresen et al. | |
| 4,693,507 | A | 9/1987 | Dresen et al. | |
| 4,733,898 | A | 3/1988 | Williams | |
| 4,807,924 | A * | 2/1989 | Kottke | 296/164 |
| 5,009,457 | A * | 4/1991 | Hall | 296/3 |
| 5,143,417 | A * | 9/1992 | Philley et al. | 296/176 |
| 5,339,852 | A * | 8/1994 | Bull | 296/164 |
| 5,415,506 | A | 5/1995 | Payne | |
| 5,720,507 | A | 2/1998 | Emery | |
| 5,788,309 | A | 8/1998 | Emery et al. | |
| 5,858,508 | A | 1/1999 | Sturtevant et al. | |
| 6,048,017 | A | 4/2000 | Doshi | |
| D426,187 | S | 6/2000 | Shultz | |
| 6,149,225 | A * | 11/2000 | Kellner | 296/173 |
| 6,224,140 | B1 * | 5/2001 | Hoplock | 296/100.17 |
| 6,283,536 | B1 * | 9/2001 | Muzyka et al. | 296/165 |
| 6,431,629 | B1 | 8/2002 | Emery | |
| 6,435,594 | B1 * | 8/2002 | Ekonen et al. | 296/165 |
| 6,509,084 | B2 | 1/2003 | Sturtevant et al. | |
| 6,629,714 | B2 | 10/2003 | Campbell | |
| 6,663,160 | B2 * | 12/2003 | Yarbrough et al. | 296/100.06 |
| 6,679,542 | B1 * | 1/2004 | Semotuk | 296/174 |
| 6,698,634 | B2 * | 3/2004 | Thomson | 296/37.6 |
| 6,712,422 | B1 * | 3/2004 | Vaillancourt | 296/164 |
| 6,932,418 | B1 * | 8/2005 | Connell | 296/161 |

(Continued)

OTHER PUBLICATIONS

U.S. Appl. No. 12/228,121.

*Primary Examiner*—Kiran B. Patel

(57) ABSTRACT

This is a one piece molded raised second tier floor with lockable horizontal doors made for a pickup truck cargo bed. In particular, it is a one piece molded insert that increases the storage area of a crowded pickup truck cargo bed camper. It also, gives the user 100% access to the storage area below while increasing the sleeping area above.

5 Claims, 8 Drawing Sheets

U.S. PATENT DOCUMENTS

| | | |
|---|---|---|
| 7,059,647 B1 | 6/2006 | Sierakowski et al. |
| 7,083,219 B1 | 8/2006 | Gregory |
| 7,178,823 B1 | 2/2007 | Tai |
| 7,229,115 B2 | 6/2007 | Wilson et al. |
| 7,290,820 B1 | 11/2007 | Smith et al. |
| 7,322,637 B2 * | 1/2008 | Smith ........................ 296/173 |
| 2002/0163221 A1 * | 11/2002 | Smith ........................ 296/164 |
| 2004/0212218 A1 * | 10/2004 | Stabile ....................... 296/159 |

* cited by examiner

VEHICLE CARGO BED TENT CAMPER SECOND TIER FLOOR

RELATED APPLICATION

The present application is a continuation in part of U.S. patent application Ser. No. 12/011,432 filed Jan. 25, 2008 now abandoned which is a continuation in part of U.S. patent application Ser. No. 11/101,322 filed Apr. 7, 2005 and issued Jan. 29, 2008 as U.S. Pat. No. 7,322,637, the subject matter of which is incorporated herein by reference.

BACKGROUND OF THE INVENTION

1. Field of the Invention

This invention relates to the vehicle cargo bed tent camper second tier floor that is made for a pickup truck. More specifically, the present invention structurally relates to a vehicle cargo bed tent camper second tier floor which functions to expand the crowded storage area of campers while expanding the sleeping area.

2. Description of the Prior Art

Outdoor activities such as camping have increased in popularity over the years along with the popularity of camping in pickup trucks and tent trailers. As these trends indicate the public wants low cost cargo bed campers giving them shelter, security, storage area and convenience all in many different model campers.

The use of cargo bed storage of known designs and configurations is known in the prior art. More specifically, cargo bed storage of known designs and configurations previously devised and utilized for the purpose of expanding storage areas through known methods and apparatuses are known to consist basically of familiar, expected, and obvious structural configurations, not withstanding the myriad of designs encompassed by the crowded prior art which has been developed for the fulfillment of countless objectives and requirements.

By way of example, U.S. Pat. No. 4,733,898 issued Mar. 29, 1988 to Williams relates to a Pickup-Bed Secure Storage Unit. This patent is directed to a bed liner assembly with center support and two drawers. One drawer is on each side of the support. Even with the drawers removed the inventor states 80% of the center which the drawers take up can only be reached from the rear entrance. There is no entrance from the top to the center storage area below and extra wide items are blocked by the center support.

There is a need for a low cost vehicle cargo bed tent camper second tier floor with access doors to 100% of the storage area below. A floor that can expand the crowded storage area in the camper and secure its contents while expanding the sleeping area.

Although primarily a second tier pickup truck floor used in camping the same floor can be used for utility and working uses.

While known devices fulfill their respective, particular objectives and requirements, the aforementioned patent does not describe a vehicle cargo bed tent camper second tier floor that allows for expanding the crowded storage area of campers while expanding the sleeping area.

In this respect, the vehicle cargo bed tent camper second tier floor according to the present invention substantially departs from the conventional concepts and designs of the prior art, and in doing so provides an apparatus primarily developed for the purpose of expanding the crowded storage area of campers while expanding the sleeping area.

Therefore, it can be appreciated that there exists a continuing need for a new and improved vehicle cargo bed tent camper second tier floor which can be used for expanding the crowded storage area of campers while expanding the sleeping area. In this regard, the present invention substantially fulfills this need.

SUMMARY OF THE INVENTION

In view of the forgoing disadvantages inherent in the known types of vehicle cargo bed tent campers now present in the prior art, the present invention provides an improved vehicle cargo bed tent camper second tier floor. As such, the general purpose of the present invention, which will be described subsequently in greater detail, is to provide a new and improved vehicle cargo bed tent camper second tier floor and method which has all the advantages of the prior art and none of the disadvantages.

To attain this, the present invention essentially comprises a vehicle cargo bed tent camper second tier floor. The vehicle cargo bed tent camper second tier floor is for expanding the crowded storage area of campers while expanding the sleeping area. First provided is an open pickup truck cargo bed. The open pickup truck cargo bed has a horizontal base and upstanding vertical sides and an upstanding vertical front wall. The base and sides and front wall are all in a rectangular configuration. The sides and front wall all terminate above in a perimeter rim. The sides have interior faces with horizontal pockets at a common intermediate elevation essentially midway between the base and the perimeter rim.

Next provided is a floor support means. At least one floor support means is in a rectangular configuration having front and rear and side edges. In this manner a support periphery is provided for being received by and supported by the horizontal pockets of the sides of the cargo bed. The support periphery has supplemental support below. The floor support defines a lower storage area below and also defines an intermediate storage area above suitable as a primary sleeping area.

The floor support means has a central opening defining a central passageway between the storage area below and the sleeping area above.

Next, a tent camper second tier floor is provided and made in two different styles: over the perimeter rim and below it. The second tier floor is in a rectangular configuration having front and rear and side edges and having a length essentially equal to the length of the cargo bed and a width the width of the cargo bed for being supported by the floor support means. The second tier floor defines the sleeping area above and the storage area below. The second tier floor is molded of a rigid construction material chosen from the class of rigid construction materials including any thermo-plastic material, especially ABS or any other suitable material including metal.

A rectangular opening is next provided centrally positioned in the second tier floor. A pair of similarly sized and similarly configured horizontal doors are provided in the opening. The horizontal doors are made in two styles: hatch doors and bi-fold doors. The rectangular opening of the second tier floor is of a size and shape to essentially overlie the central passageway of the floor support means.

Next provided is a vertically positioned rear door. The rear door has the upper section secured to the rear edge of the second tier floor.

Raised ribbed flat channels with grooved anti-skid top surface molded in the second tier floor giving the channels a north and south direction while adding strength and safety.

Hinges are provided. At least one hinge pivotally coupling the horizontal doors and the rear door to the second tier floor and their opening for movement between a closed orientation position and a open orientation position, both giving access to the storage area. In this manner 100% access is provided to a user in the sleeping area to the storage area below.

A lock is provided. At least one lock secures the horizontal doors and the rear door in a closed orientation with the second tier floor.

Next provided is a cover in a rectangular configuration having essentially slightly greater length than the length of the cargo bed and a width slightly greater than the width of the cargo bed for being received and supported by the second tier floor and the perimeter rim of the sides of the cargo bed. The cover defines the upper sleeping area above and is adapted to protect the floor and its contents from the weather.

Lastly, a logo is provided. A logo is on the upper center section of the rear door above the lock and the center of the front wall both at a location facing rearward for being viewed by a person following.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawing. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle cargo bed tent camper second tier floor which has all of the advantages of the prior art vehicle cargo bed tent campers and none of the disadvantages.

It is another object of the present invention to provide a new and improved vehicle cargo bed tent camper second tier floor which may be easily and efficiently manufactured and marketed.

It is a further object of the present invention to provide a new and improved vehicle cargo bed tent camper second tier floor which is made of durable and reliable construction.

Even still another object of the present invention is to provide a vehicle cargo bed tent camper second tier floor for expanding the crowded storage area of campers while expanding the sleeping area.

Lastly, it is an object of the present invention to provide a new and improved vehicle cargo bed tent camper second tier floor. An open pickup truck cargo bed has sides with a horizontal base below and a perimeter rim above. Floor support means, received by and supported by the cargo bed horizontal pockets, are at an elevation between the base and the perimeter rim. A tent camper second tier floor, received by and supported by the floor support means, defines the intermediate sleeping area above and the storage area below. A rectangular opening with horizontal doors is centrally positioned in the second tier floor. The door and the opening are pivotally coupled by at least one hinge for movement of the horizontal doors between a closed orientation in the plane of the second tier floor and an open orientation above the second tier floor.

These together with other objects of the invention, along with various features of Novelty which characterize the invention, are pointed out with particularity in the claims Annexed to and forming a part of the disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
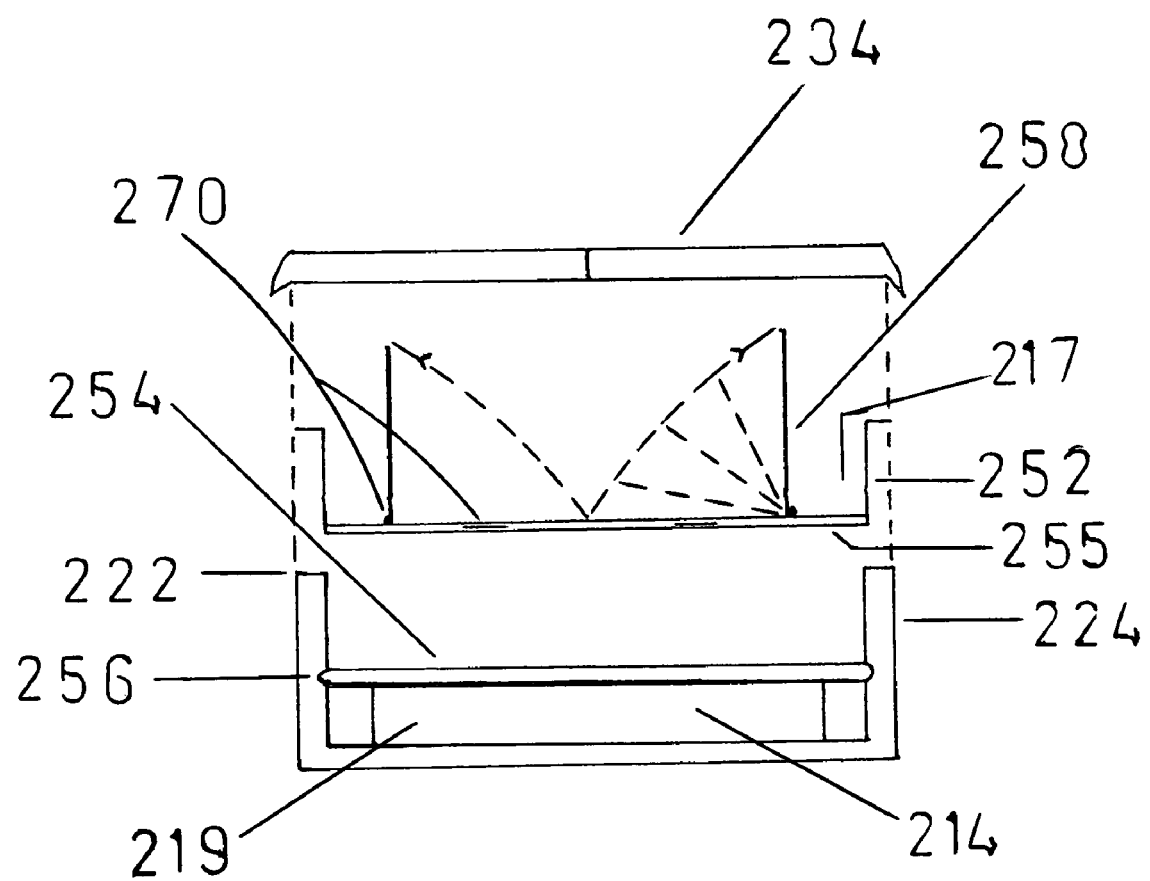
FIG. 1 is a rear view of an assembly of a pickup truck open cargo bed 214, over the perimeter rim second tier floor 252 with horizontal hatch door 258 movement, open rear door 255 and cargo bed cover 234.
Figure 2:
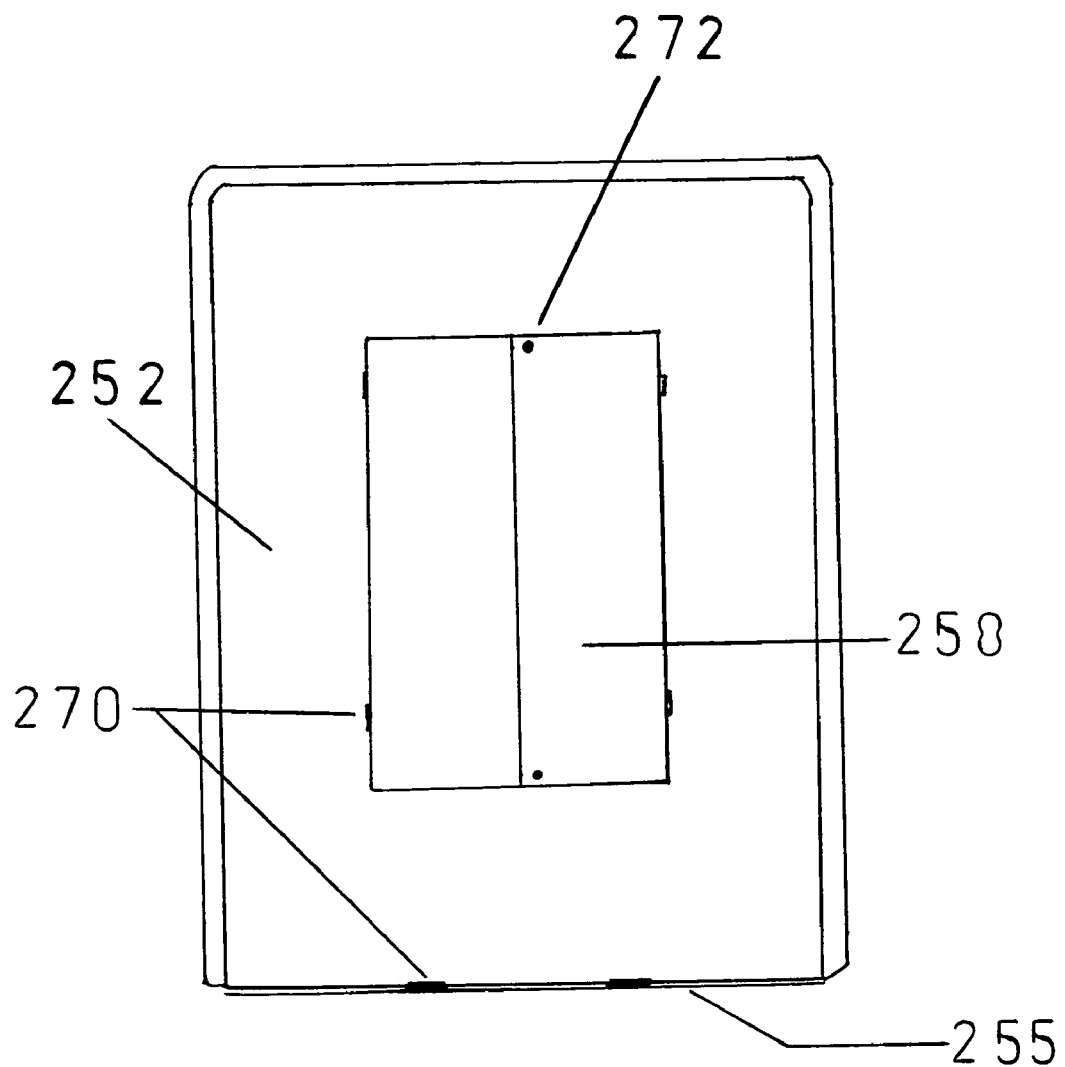
FIG. 2 is a top view of closed horizontal hatch doors 258 in a over the perimeter rim second tier floor 252 and closed rear door 255.
Figure 3:
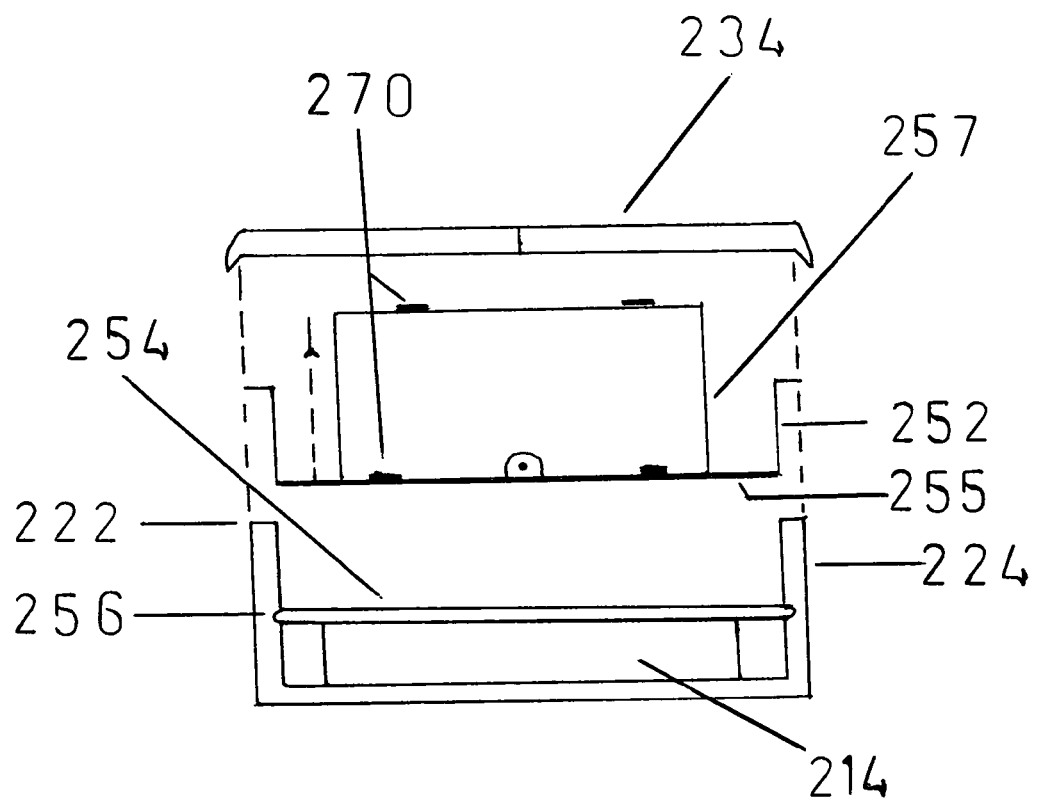
FIG. 3 is a rear view of an assembly of the pickup truck open cargo bed 214, over the perimeter rim 222 second tier floor 252 with horizontal bi-fold door 257 movement, open rear door 255 and cargo bed cover 234.
Figure 4:
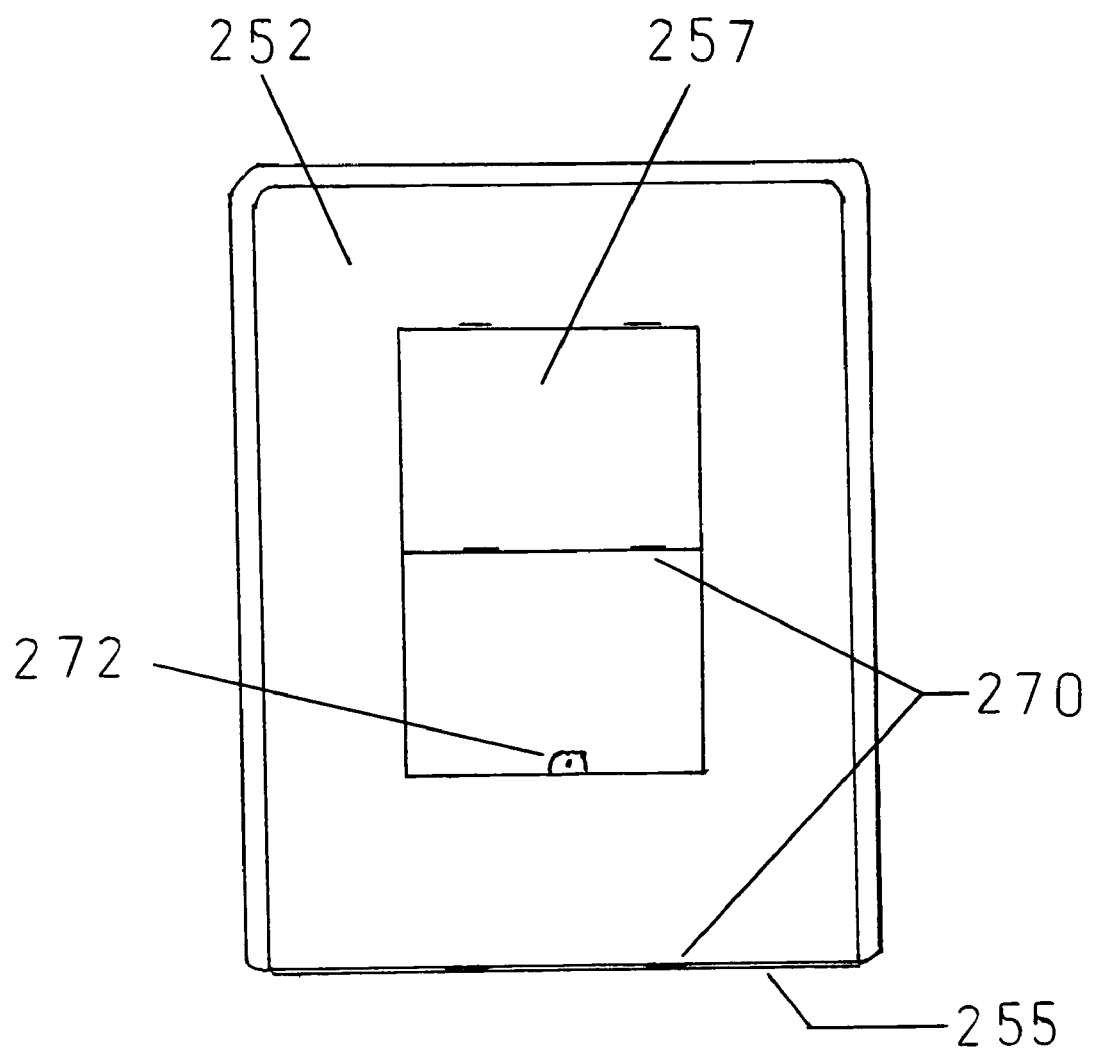
FIG. 4 is a top view of closed horizontal bi-fold doors 257 in a over the perimeter rim 222 second tier floor 252 and closed rear door 255.
Figure 5:
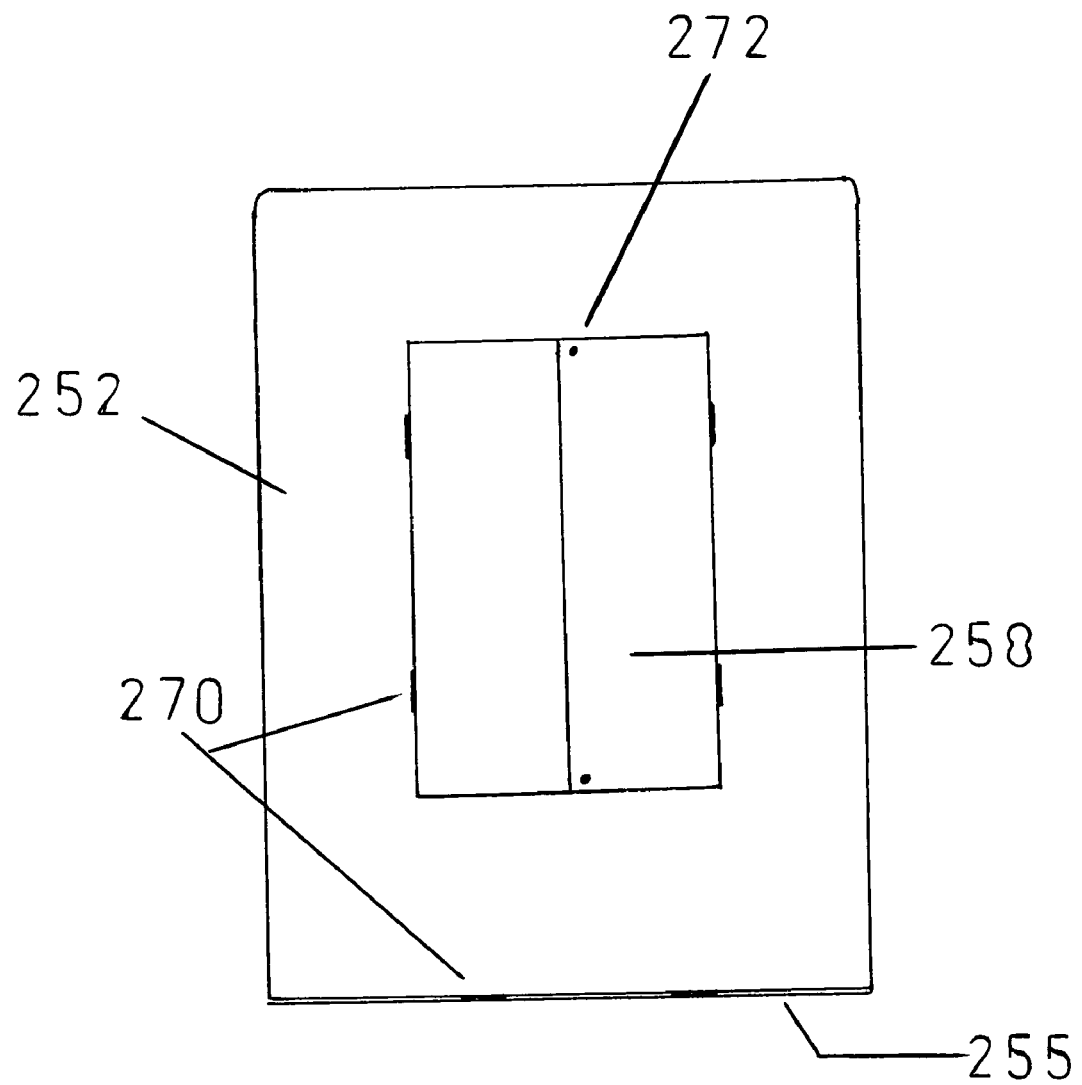
FIG. 5 is a top view of a vehicle cargo bed tent camper second tier floor 252 that fits below the perimeter rim 222 and closed rear door 255.
Figure 6:
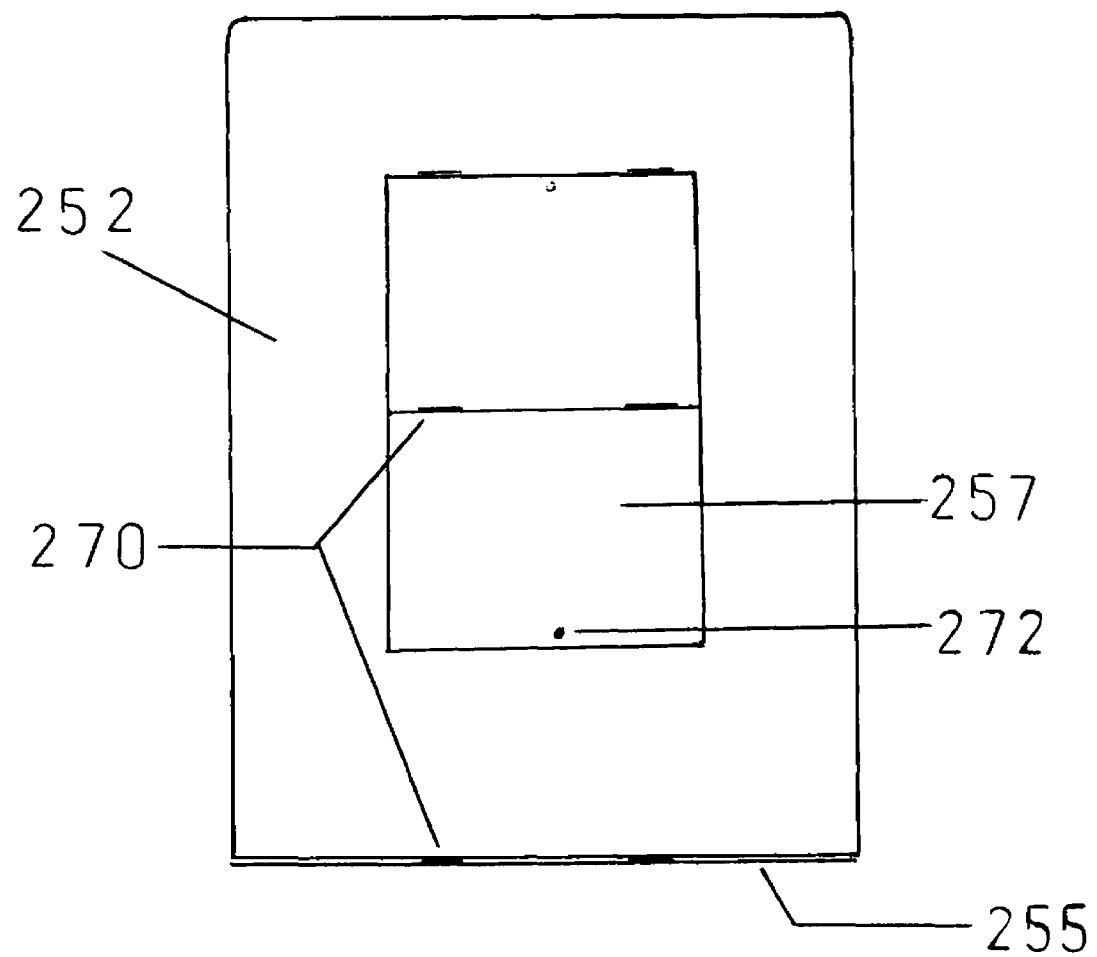
FIG. 6 is a top view of the second tier floor 252 with closed horizontal bi-fold doors 257 and closed rear door 255 that fits below the perimeter rim 222.
Figure 7:
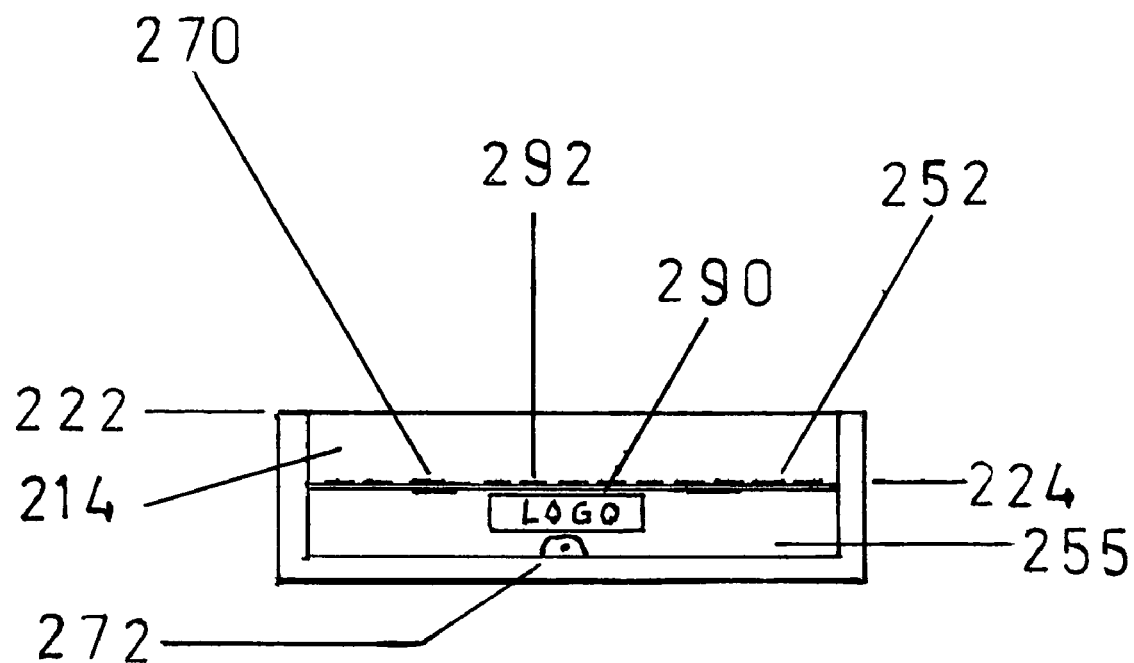
FIG. 7 is a rear view of a open pickup truck cargo bed 214 with a below the perimeter rim 222 raised ribbed channels 292 second tier floor 252 and closed rear door 255 with logo 290.
Figure 8:
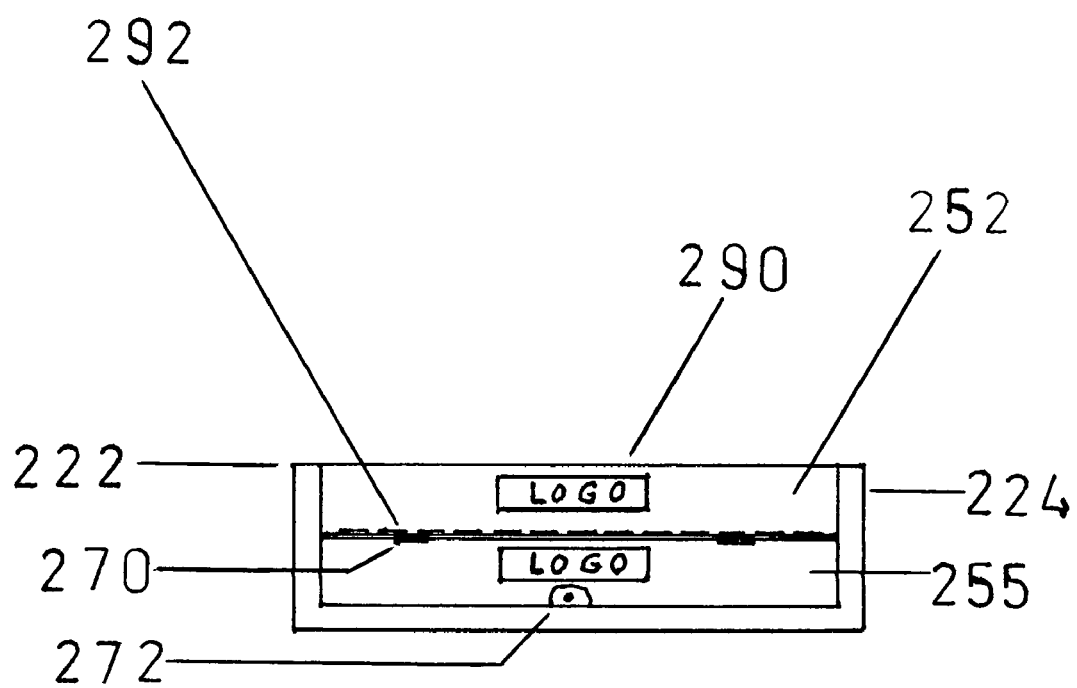
FIG. 8 is a rear view of a open pickup truck cargo bed with a over the perimeter Rim 222 raised ribbed channels 292 second tier floor 252 and closed rear door 255 with logos 290 locks 272.

With reference now to the drawings, and in particular to FIG. 1 thereof, the preferred embodiment of the new and improved over the perimeter rim 222 vehicle cargo bed tent camper second tier floor 252 embodying the principles and concepts of the present invention will be described.

The present invention, the vehicle cargo bed tent camper second tier floor 252 is comprised of a plurality of components. Such components in their broadest context include an open pickup truck cargo bed 214, a floor support means 256, a tent camper second tier floor with a centrally positioned rectangular opening with hinged horizontal doors: bi-fold doors 257 and hatch doors 258. Such components are individually configured and correlated with respect to each other so as to attain the desired objective. The vehicle cargo bed tent camper second tier floor is for expanding the crowded storage area of the campers while expanding the sleeping area. First provided is an open pickup truck cargo bed 214. The open pickup truck cargo bed 214 has a horizontal base and upstanding vertical sides 224 and an upstanding vertical front wall. The base and sides and front wall are all in a rectangular configuration. The sides terminate above in a perimeter rim 222. The sides have interior faces with horizontal pockets 256 at a common intermediate elevation essentially midway between the base and the perimeter rim 222.

Next provided is a floor support means 254. At least one floor support means 254 is in a rectangular configuration having front and rear and side edges. In this manner a support periphery is provided for being received by and supported by the horizontal pockets 256 of the sides of the cargo bed. The support periphery has supplemental support below. The floor support means 254 defines a lower storage area below and also defines an intermediate storage area above suitable as a primary sleeping area. The floor support means 254 has a central opening defining a central passageway between the storage area below and the sleeping area above.

Next, a molded camper second tier floor 252 is provided. The second tier floor 252 is in a rectangular configuration having front and rear and side edges and having a length essentially equal to the length of the cargo bed and a width the width of the cargo bed for being supported by the floor support means 254. The second tier floor defines the sleeping area above 217 and the storage area below 219. The second tier floor is molded of a rigid construction material chosen from the class of rigid materials including thermoplastics, especially ABS and any other suitable material including metal.

A rectangular opening is next provided centrally positioned in the second tier floor. A pair of similarly sized and similarly configured horizontal doors 257, 258 are provided in the opening. Horizontal door 257 is a bi-fold door and horizontal door 258 is a hatch door. The rectangular opening of the second tier floor is of a size and shape to essentially overlie the central passageway of the floor support means 254.

Next provided is a vertical positioned rear door 255. The top of the rear door is secured to the rear edge of the second tier floor giving the edge added support and another entrance to the storage area below.

Raised ribbed flat grooved channels with anti skid top surface 292 molded in the second tier floor giving the channels a north and south direction while adding strength and safety.

Hinges 270 pivotally couple the horizontal doors to the opening of the second tier floor for movement of the horizontal doors between a closed orientation in the plane of the second tier floor and an open orientation above the second tier floor. In this manner access is provided to the user from the sleeping area to the storage area below. At least one hinge couples the upper edge of the rear door to the second tier floor A lock 272 is provided. At least one lock secures the horizontal doors in a closed orientation with respect to the second tier floor. At least one lock is in the lower edge of the rear door.

Next provided is a cover 234 in a rectangular configuration having a length essentially slightly greater than the length of the cargo bed and a width slightly greater than the width of the cargo bed for being received and supported by the perimeter rim of the sides of the cargo bed. The cover defines the upper sleeping area above and is adapted to protect the floor and goods from the weather.

Lastly, a logo 290 is provided. The logo is on the upper section of the rear door at a location below the hinge. Another logo is on the center of the front wall both facing rearward for being viewed by a person following.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact size, construction and operation shown and described, and accordingly, all suitable modifications and equivalents may be resorted to, falling within the scope of the invention.

What I claim as being new and desired to be protected by Letters Patent of the United States is as follows:

1. A vehicle cargo bed tent camper second tier floor 252 molded and made for an open pickup truck cargo bed 214 having vertical sides 224 with a horizontal base below and a perimeter rim 222 above comprising:
    a floor support means 254 at least one received by and supported by the cargo bed horizontal pockets 256, the floor support means 254 being at an elevation between the horizontal base and the perimeter rim 222;
    the tent camper second tier floor 252 received by and supported by the floor support means 254, the rectangular second tier floor 252 defining the intermediate sleeping area above 217 and a storage area below 219;
    the tent camper second tier floor 252 that is made in below the perimeter rim 222 style;
    horizontal doors 258 of similarly sized and similarly configured are provided in the rectangular opening centrally positioned in the second tier floor 252;
    a vertically positioned rear door 255 secured to the rear edge of the second tier floor 252 giving the edge added support and another entrance to the storage below 219;
    at least one hinge 270 pivotally coupling the horizontal doors 258 and the tear door 255 to the second tier floor 252 and their opening for movement between a closed orientation position and open orientation position, both giving access to the storage area below 219; and
    a logo 290 is on the upper section of the rear door 255 at a location below the hinge 270 and another on center of the front wall.

2. The floor as set forth in claim 1 wherein at least one lock 272 for locking the horizontal doors 258 and the rear door 255 in a closed orientation with respect to the second tier floor 252.

3. The floor as set forth in claim 1 wherein the horizontal doors are hatch doors 258.

4. The floor as set forth in claim 1 wherein the horizontal doors are bi-fold doors 257.

5. A vehicle cargo bed tent camper second tier floor 252, in combination with an open pickup truck cargo bed having a horizontal base and upstanding vertical sides an upstanding vertical front wall, the base and sides 224 and front wall all being in a rectangular configuration, the sides 224 also terminating above in a perimeter rim 222. the sides 224 having interior faces with horizontal pockets 256 at a common intermediate elevation essentially midway between the base and the perimeter rim 222, comprising:

- a floor support means 254 at least one in a rectangular configuration having front and rear and side edges for providing a support for being received by and supported by the horizontal pockets 256 of the sides 224 of the cargo bed, the floor support means 254 having a central opening defining a central passageway between the storage area below 219 and the sleeping area above 217;
- the tent camper second tier floor 252 in a rectangular configuration having front and rear and side edges and having a length essentially equal to the cargo bed and a width the width of the cargo bed for being supported by the floor support means 254, the second tier floor 252 defining the sleeping area above 217 and the storage area below 219, the second tier floor 252 being molded of a rigid construction material chosen from the class of rigid construction materials including any thermoplastic materials, especially ABS and any other suitable material including metal;
- a pair of horizontal doors 258 similarly sized and similarly configured in the centrally positioned rectangular opening, the horizontal doors 258 having parallel interior and exterior sides, the rectangular opening of the second tier floor 252 being of a size and shape to essentially overlie the central passageway of the floor support means 254;
- a vertically positioned rear door 255 is secured to the rear edge of the second tier floor 252;
- a raised ribbed flat channels with grooved anti-skid top surface 292 molded in the second tier floor 252;
- at least one hinge 270 pivotally coupling the horizontal doors 258 to the opening of the second tier floor 252 for movement of the horizontal doors 258 between a closed orientation in the plane of the second tier floor 252 and an open orientation above the second tier floor 252 for providing a user access from the sleeping area above 217 to the storage area below 219, hinges 270 couple the upper edge of the rear door 255 to the second tier floor 252;
- at least one lock 272 in the edges of the horizontal doors 258 for locking the horizontal door in a closed orientation with respect to the second tier floor 252 and a lock 272 in the bottom of the rear door 255; and
- a logo 290 is located on the center section of the rear door 255 and the center of the front wall.

* * * * *